(12) United States Patent
Iwaizono

(10) Patent No.: US 6,925,400 B2
(45) Date of Patent: Aug. 2, 2005

(54) SECOND BATTERY CONTROL CIRCUIT

(75) Inventor: Yoshinori Iwaizono, Okayama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/708,114

(22) Filed: Feb. 10, 2004

(65) Prior Publication Data

US 2004/0167741 A1 Aug. 26, 2004

Related U.S. Application Data

(62) Division of application No. 09/700,583, filed on Jan. 19, 2001, now Pat. No. 6,714,882.

(30) Foreign Application Priority Data

Mar. 16, 1999 (JP) ............................................. 11-071071
Mar. 16, 2000 (WO) ................................ PCT/JP00/01627

(51) Int. Cl.[7] ................................................. H02J 7/00
(52) U.S. Cl. .......................... 702/63; 702/136; 320/150
(58) Field of Search ............................... 702/63–65, 57, 702/99, 130, 132, 133, 136, 182, 183, 188; 320/152, 162, 113, 107, 151–154, 137, 134, 128, 130, 150; 429/61, 62, 56, 57, 59, 90, 92; 324/426, 429, 431, 434; 340/455, 449, 657, 660, 636.1, 636.13, 636.15, 636.17, 636.18, 636.2; 374/137, 141, 142, 163, 183; 700/286, 291–293, 295–297, 299

(56) References Cited

U.S. PATENT DOCUMENTS 3,599,071 A    8/1971    Enghlen et al. ............. 320/150
5,563,496 A    10/1996    McClure ...................... 320/128
5,581,170 A    12/1996    Mammano et al. ......... 320/116
5,619,430 A    4/1997    Nolan et al. .................. 702/63
5,703,466 A    12/1997    Honda et al. ............... 320/152
5,731,685 A    3/1998    Jones ......................... 320/150
5,760,570 A *   6/1998    Nagai et al. ................ 320/162
5,828,202 A    10/1998    Tamai ........................ 320/141
5,864,224 A    1/1999    Takechi et al. ............. 320/152
5,990,663 A *   11/1999    Mukainakano .............. 320/134
6,118,255 A    9/2000    Nagai et al. ................ 320/152
6,163,131 A *   12/2000    Gartstein et al. ........... 320/118
6,184,659 B1    2/2001    Darmawaskita ............. 320/139
6,322,921 B1    11/2001    Iwaizono et al. ............. 429/56

* cited by examiner

Primary Examiner—Hal Wachsman
(74) Attorney, Agent, or Firm—Snell & Wilmer, L.L.P.

(57) ABSTRACT

According to the present invention, there is provided a secondary battery control circuit which can perform a reliable charge/discharge control without activating Positive Temperature Coefficient element. The secondary battery control circuit includes a temperature detection section for detecting a temperature of the secondary battery and a system logic for controlling charging/discharging of the secondary battery based on the temperature detected by the temperature detection section. The system logic interrupts the charging of the secondary battery in a case where the temperature detected by the temperature detection section is out of a predetermined first temperature range, and interrupts the discharging of the secondary battery in a case where the temperature detected by the temperature detection section is out of a predetermined second temperature range.

6 Claims, 6 Drawing Sheets

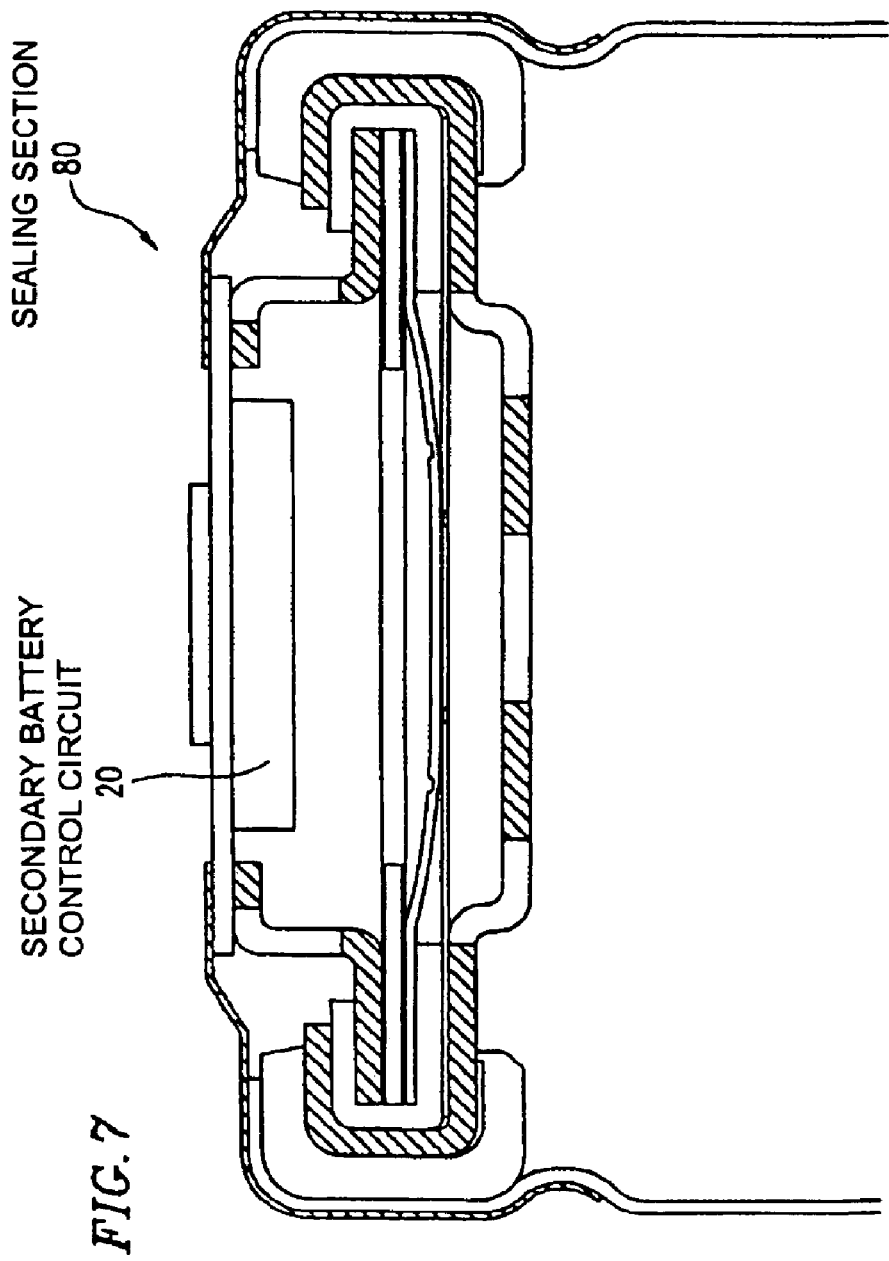

SECOND BATTERY CONTROL CIRCUIT

CROSS REFERENCE TO RELATED APPLICATIONS

This application is a divisional of and claims benefit priority to U.S. Non-Provisional patent application Ser. No. 09/700,583 (with a 35 U.S.C. §371(c) filing date of Jan. 19, 2001), now U.S. Patent No. 6.714.882 (issued Mar. 30, 2004), which is hereby incorporated by reference. This a application also claims priority to PCT Application No. PCT/JP00/01627 (Mar. 16, 2000) and Japanese Document No. 11-71071 (Mar. 16, 1999), which are hereby incorporated by reference.

TECHNICAL FIELD

The present invention relates to a secondary battery control circuit, and specifically, to a control circuit for reliably performing the charging and discharging of a lithium ion secondary battery.

BACKGROUND OF INVENTION

In the past, as controls for the charging of a lithium ion secondary battery, a charging voltage control, a charging current control, a control which enables the charging only within a predetermined temperature range, and the like, have been incorporated in a battery charger. In a battery pack in which a lithium ion secondary battery, etc., is incorporated, a control which detects the voltage of a battery and interrupts the charging when the voltage is equal to or greater than a predetermined voltage value is provided as a provision for the case where charging voltage control does not work. The above-described charging interruption control provided in the battery pack is termed as overcharge protection.

Furthermore, a control has been performed in which the temperature of a battery in the above-described battery pack is measured by a thermistor, an output of which is connected to a battery charger, and in the battery charger, the charging is enabled only within a predetermined temperature range.

On the other hand, conventionally, as the control associated with the discharging of the lithium ion secondary battery, etc., a control which interrupts the discharging when a load short-circuit occurs, a control which detects an excessive rush current during the discharging and interrupts the discharging, and a control which detects a constant current during the discharging and interrupts the discharging have been performed. These controls are generically referred to as an overcurrent protection.

Controls at the battery pack side, such as the above-described overcharge protection, the thermistor control, and the overcurrent protection, are generically referred to as safety circuits.

The above-described overcurrent protection is one of the protection functions for a battery such as a lithium ion secondary battery, etc. However, in many cases, in preparation for a case where this protection does not work, a PTC element having a ring shape is installed in the lithium ion secondary battery itself, or a PTC element is provided in the battery pack.

The PTC (Positive Temperature Coefficient) element is an element such that the resistance value is low during a normal operation, but abruptly increases when heated by itself or by an ambient temperature. This element has been used for overcurrent/heatup protection.

A battery pack which uses a lithium ion secondary battery and the secondary battery control circuit (safety circuit) is described in, for example, Japanese Laid-Open Publication No. 10-275612.

However, in the above-described conventional structure, in the case where a PTC element having a ring shape which has been installed in a lithium ion secondary battery itself is activated, an expansion force in a direction of the thickness of the PTC element is affected in a direction in which a caulking portion of a battery sealing portion is opened. This has been a cause for leakage of electrolytic solution. Furthermore, there has been a concern that the deterioration in a life cycle or the swelling of the secondary battery which results from the fully-charged lithium ion secondary battery, etc., being left in a high temperature condition.

Furthermore, there has been a concern that circuit malfunction, corrosion, or problems due to hydrofluoric acid generated by adding water to an electrolytic solution may be caused in the case where a liquid infiltrates into a secondary battery such as a lithium ion secondary battery or into a battery pack in which the above-described secondary battery is installed, or in the case where an electrolytic solution inside the battery is leaked.

In general, the main component of an electrolytic solution which is used for a lithium ion secondary battery is lithium hexafluorophosphate.

The chemical reaction caused in the case where water is infiltrated into lithium hexafluorophosphate is represented by expression (1-1). By this chemical reaction, hydrofluoric acid (i.e., a very strong acid) is generated.

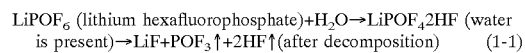

$LiPOF_6$ (lithium hexafluorophosphate)+$H_2O$→$LiPOF_4$2HF (water is present)→$LiF$+$POF_3$↑+2HF↑(after decomposition)   (1-1)

The present invention solves such conventional problems. An objective of the present invention is to provide a secondary battery control circuit which can reliably control charging/discharging without activating a PTC element, which reduces deterioration in life cycle and the occurrence of swelling of the battery, and which can be installed in a small space section in a battery pack.

SUMMARY OF INVENTION

In order to achieve a solution to the above problem, a secondary battery control circuit of the present invention includes: a temperature detection section for detecting a temperature of a secondary battery; and a control section for controlling charging/discharging of the secondary battery based on a temperature detected by the temperature detection section, wherein the control section interrupts charging of the secondary battery in a case where the temperature detected by the temperature detection section is out of a predetermined first temperature range, and interrupts discharging of the secondary battery in the case where the temperature detected by the temperature detection section is out of a predetermined second temperature range. Thus, a liquid leakage phenomenon of an electrolytic solution due to the activation of a ring-shaped PTC element installed in a lithium ion secondary battery itself can be prevented.

The predetermined second temperature range may include the predetermined first temperature range.

A secondary battery control circuit of the present invention includes: a voltage detection section for detecting a voltage of a secondary battery; a temperature detection section for detecting a temperature of the secondary battery; and a control section for controlling charging/discharging of the secondary battery based on a voltage detected by the voltage detection section and a temperature detected by the temperature detection section, wherein in a case where the voltage detected by the voltage detection section is equal to or greater than a predetermined first voltage value, and the temperature detected by the temperature detection section is equal to or greater than a predetermined temperature, the control section discharges the secondary battery until the voltage of the secondary battery reaches a predetermined second voltage value. Thus, the deterioration in life cycle and swelling of the battery which result from a fully-charged secondary battery, such as a lithium ion secondary battery, etc., being left in a high temperature condition can be prevented.

It is preferable that the predetermined first voltage value and the predetermined second voltage value are detected by a single circuit having a hysteresis.

It is preferable that either the predetermined first voltage value or the predetermined second voltage value is equal to an overcharge releasing voltage value.

A discharge canceling condition for the secondary battery may include a temperature condition for the secondary battery.

A secondary battery control circuit of the present invention includes a control section for interrupting charging/discharging of the secondary battery in the case where a liquid is detected by a liquid detection section for detecting infiltration or generation of a liquid inside the secondary battery or inside a battery pack in which the secondary battery is installed. In such a structure, when circuit malfunction, corrosion, or problems due to hydrofluoric acid generated by adding water to an electrolytic solution (which may be caused in the case where a liquid is infiltrated into a secondary battery such as a lithium ion secondary battery or into a battery pack in which the above-described secondary battery is installed, or in the case where an electrolytic solution inside the battery is leaked) are caused, the charging/discharging of the secondary battery is disabled, whereby a user can be notified of the occurrence of a problem.

The secondary battery control circuit further includes a temperature detection section for detecting a temperature of the secondary battery, and the control section may control charging/discharging of the secondary battery based on a temperature detected by the temperature detection section.

In the case where the secondary battery control circuit is formed on a single semiconductor chip, a small sized secondary battery control circuit is achieved. By enclosing the semiconductor chip in a sealing section of the secondary battery or by mounting the semiconductor chip in a narrow space section of a battery pack, a secondary battery in which a secondary battery control circuit is installed or a small sized secondary battery pack in which a secondary battery control circuit is mounted in a narrow space section of, battery pack can be provided.

Hereinafter, functions of the present invention are described.

According to one aspect of the invention, in the case where a temperature detected by a temperature detection section is out of a predetermined first temperature range or out of a predetermined second temperature range, charging/discharging of the secondary battery is interrupted. This prevents a liquid leakage phenomenon of an electrolytic solution due to the activation of a PTC element installed in the secondary battery.

According to another aspect of the invention, in the case where a voltage detected by a voltage detection section is equal to or greater than a predetermined third first voltage value, and the temperature detected by a temperature detection section is equal to or greater than a predetermined fourth temperature, the secondary battery is discharged until the voltage of the secondary battery reaches a predetermined second voltage value which is smaller than the predetermined first voltage value. By such a forced discharge, deterioration in the life cycle and swelling of the secondary battery due to the charged secondary battery being in the high temperature condition can be prevented.

According to yet another aspect of the invention, in the case where the generation of a liquid is detected by a liquid detection section, charging/discharging of the secondary battery is interrupted. This allows a user to notice a malfunction or a corrosion or a circuit due to a liquid, such as water or an electrolytic solution, etc., or a problem caused due to hydrofluoric acid being generated by addition of water to an electrolytic solution.

BRIEF DESCRIPTION OF DRAWINGS

FIG. 7 is a cross-sectional view which shows a sealing section 80 of the secondary battery 10.

DETAILED DESCRIPTION

Hereinafter, an embodiment of the present invention will be described with reference to the drawings.

Figure 1:
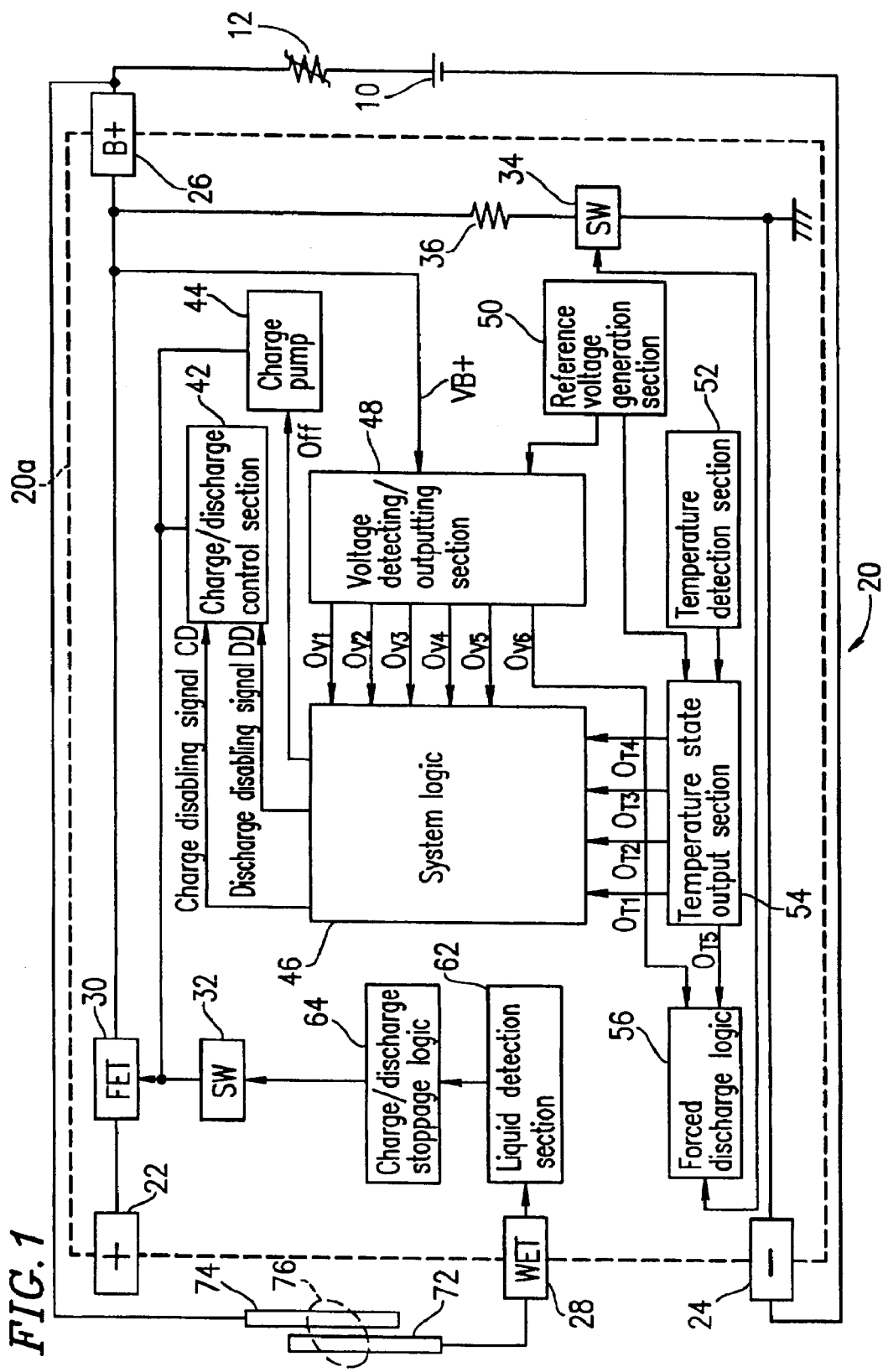
FIG. 1 is a drawing which shows a configuration of a control circuit 20 of a secondary battery 10 according to an embodiment of the present invention.

FIG. 1 shows a configuration of a control circuit 20 of a secondary battery 10 (hereinafter, referred to as a secondary battery control circuit 20) according to an embodiment of the present invention. The secondary battery 10 is, for example, a lithium ion secondary battery.

The secondary battery control circuit 20 is formed on a semiconductor chip 20a. In FIG. 1, an area encompassed by a dotted line denotes an area occupied by the secondary battery control circuit 20 formed on the semiconductor chip 20a. The secondary battery control circuit 20 is provided with a positive (+) terminal 22, a negative (−) terminal 24, and a B+ terminal 26.

The secondary battery 10 is connected between the negative (−) terminal 24 and the B+ terminal 26. A PTC element 12 is connected in series with the secondary battery 10.

A battery charger (not shown) or a load (not shown) can be connected between the positive (+) terminal 22 and the negative (−) terminal 24.

A FET 30 is provided between the positive (+) terminal 22 and the B+ terminal 26. The FET 30 is a type of switching element that is switchable among four states based on a gate voltage. A function and an operation of the FET 30 are equivalent to, for example, a function and an operation of a FET switching element mounted on a semiconductor chip named UCC3911 commercially available from UNITRODE Co. The function and the operation of this switching element are disclosed in U.S. Pat. No. 5,581,170.

The four states of the FET 30 are switched in response to an output from a switch (SW) 32 or an output from a charge/discharge control section 42. The four states of the FET 30 are as shown below.

On state: the secondary battery 10 is chargeable and dischargeable.

Off state: the secondary battery 10 is not chargeable or dischargeable.

Intermediate state 1: the secondary battery 10 is chargeable but is not dischargeable.

Intermediate state 2: the secondary battery 10 is not chargeable but is dischargeable.

The secondary battery control circuit 20 controls the charging/discharging of the secondary battery 10 by controlling the state of the FET 30. Hereinafter, how the secondary battery control circuit 20 controls the FET 30 will be described in detail.

A temperature detection section 52 detects the temperature of the secondary battery 10. The temperature detection section 52 and the secondary battery 10 are thermally coupled by, for example, a metal plate, silicone, etc. The temperature detection section 52 can utilize, for example, a temperature characteristic of a semiconductor. The temperature detection section 52 outputs an analog signal indicative of a detected temperature. The analog signal is supplied to a temperature state output section 54.

The temperature state output section 54 outputs an output signal ($O_{T1}$–$O_{T4}$) corresponding to the detected temperature to a system logic 46, and outputs an output signal $O_{T5}$ corresponding to the detected temperature to a forced discharge logic 56. To the temperature state output section 54, a reference voltage is supplied from a reference voltage generation section 50.

Figure 2:
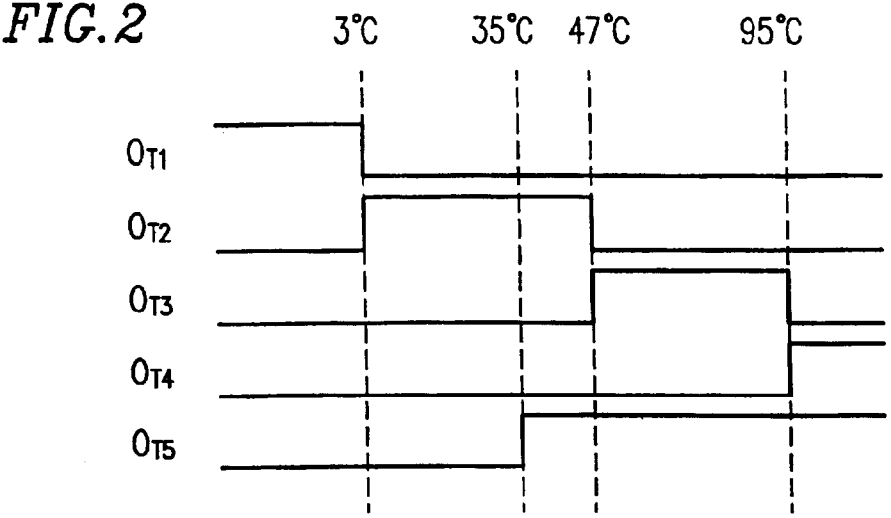
FIG. 2 is a drawing which shows a relationship between a detected temperature and logic levels of output signals $O_{T1}$–$O_{T5}$.

FIG. 2 shows a relationship between a detected temperature and the logic levels of output signals $O_{T1}$–$O_{T5}$. In the case where the detected temperature is denoted by $T_b$, the logic levels of output signals $O_{T1}$–$O_{T5}$ are defined as below:Output signal $O_{T1}$: when $T_b<3°$ C., H level; otherwise, L level.

Output signal $O_{T2}$: when $3°$ C.$\leq T_b \leq 47°$ C., H level; otherwise, L level.

Output signal $O_{T3}$: when $47°$ C.$<T_b \leq 95°$ C., H level; otherwise, L level.

Output signal $O_{T4}$: when $95°$ C.$<T_b$, H level; otherwise, L level.

Output signal $O_{T5}$: when $35°$ C.$\leq T_b$, H level; otherwise, L level.

It should be noted that the temperature ranges shown in FIG. 2 are merely examples, and that the present invention is not limited to the temperature ranges shown in FIG. 2.

The system logic 46 receives the above-described output signals $O_{T1}$–$O_{T4}$, and determines which of the output signals $O_{T1}$–$O_{T4}$ is at a H level, thereby determining which of a plurality of temperature ranges (i.e., temperature ranges I–VI shown below) the detected temperature $T_b$ is in. Herein, the temperature ranges I–VI are defined as:

Temperature range I: $T_b<3°$ C.
Temperature range II: $3°$ C.$\leq T_b \leq 47°$ C.
Temperature range III: $47°$ C.$<T_b \leq 95°$ C.
Temperature range IV: $95°$ C.$<T_b$
Temperature range V: $T_b<35°$ C.
Temperature range VI: $35°$ C.$<T_b$ In the case where the detected temperature $T_b$ is within the temperature range II, the system logic 46 sets a charge disabling signal CD to a H level; in the case where the detected temperature $T_b$ is within the temperature range I, III, or IV, the system logic 46 sets the charge disabling signal CD to a L level. Herein, the charge disabling signal CD being at a H level means that charging of the secondary battery 10 is allowed; the charge disabling signal CD being at a L level means that charging of the secondary battery 10 is prohibited.

In the case where the detected temperature $T_b$ is within the temperature range I, II, or III, the system logic 46 sets a discharge disabling signal DD to a H level; in the case where the detected temperature $T_b$ is within the temperature range IV, the system logic 46 sets the discharge disabling signal DD to a L level. Herein, the discharge disabling signal DD being at a H level means that discharge of the secondary battery 10 is allowed; the discharge disabling signal DD being at a L level means that discharge of the secondary battery 10 is prohibited.

Figure 3:
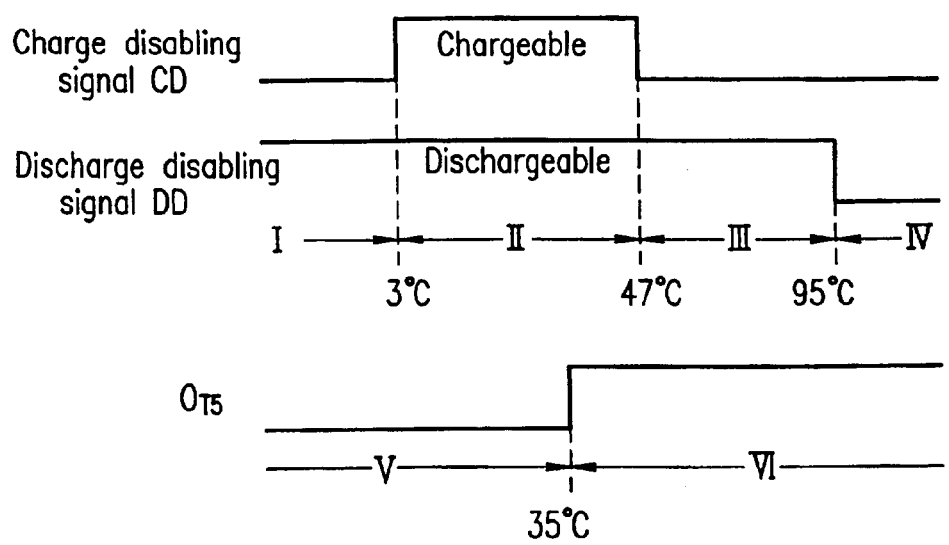
FIG. 3 is a drawing which shows a relationship between a detected temperature $T_b$ and logic levels of a charge disabling signal CD and a discharge disabling signal DD.

FIG. 3 shows a relationship between the detected temperature $T_b$ and the logic levels of the charge disabling signal CD and the discharge disabling signal DD. The charge disabling signal CD and the discharge disabling signal DD are output from the system logic 46, and are supplied to the charge/discharge control section 42. Furthermore; FIG. 3 also shows a relationship between the detected temperature $T_b$ and the logic level of the output signal $O_{T5}$.

In response to the charge disabling signal CD at a H level and the discharge disabling signal DD at a H level, the charge/discharge control section 42 sets the state of the FET 30 to the "ON state". Similarly, in response to the charge disabling signal CD at a L level and the discharge disabling signal DD at a L level, the charge/discharge control section 42 sets the state of the FET 30 to the "OFF state"; in response to the charge disabling signal CD at a H level and the discharge disabling signal DD at a L level, the charge/discharge control section 42 sets the state of the FET 30 to the "Intermediate state 1"; in response to the charge disabling signal CD at a L level and the discharge disabling signal DD at a H level, the charge/discharge control section 42 sets the state of the FET 30 to the "Intermediate state 2".

The operation of a charge pump 44 is controlled by a control signal Off output from the system logic 46.

In this way, in the case where the detected temperature $T_b$ is not within the temperature range II, the charge/discharge control section 42 controls the FET 30 so as to interrupt the charging of the secondary battery 10. In the case where the detected temperature $T_b$ is not within the temperature range I, II, or III, the charge/discharge control section 42 controls the FET 30 so as to interrupt the discharging of the secondary battery 10. The discharging of the secondary battery 10 is interrupted when the detected temperature $T_b$ is not within the temperature range I, II, or III, whereby the secondary battery 10 can be controlled so that the secondary battery 10 is not discharged when the detected temperature $T_b$ is within the temperature range in which an adverse effect can be caused to the PTC element 12. As a result, the safety in charging/discharging the secondary battery 10 can be improved.

The secondary battery control circuit 20 further includes a WET terminal 28. As shown in FIG. 1, a detected pattern 72 is connected to a liquid detection section 62 through the WET terminal 28. A B+ input/output pattern 74 is provided adjacent to the detected pattern 72. The B+ input/output pattern 74 is connected to the B+ terminal 26. The detected pattern 72 and the B+ input/output pattern 74 are in close proximity so that the distance therebetween is about 0.1 mm, but are electrically separated. Thus, in a normal state, the impedance (resistance value) between the detected pattern 72 and the B+ input/output pattern 74 is a value approaching infinity.

The attachment of a liquid 76, such as water, an electrolytic solution, etc., reduces the impedance (resistance value) between the detected pattern 72 and the B+ input/output pattern 74 to several tens to several hundreds of kilo-Ohms. By detecting the reduction in this impedance (resistance value), the liquid detection section 62 detects infiltration or generation of the liquid in the secondary battery 10 or in a battery pack in which the secondary battery 10 is installed. For example, in the case where the secondary battery control circuit 20 is mounted on a printed circuit board, the detected pattern 72 and the B+ input/output pattern 74 can be readily formed as conductive patterns.

Figure 4:
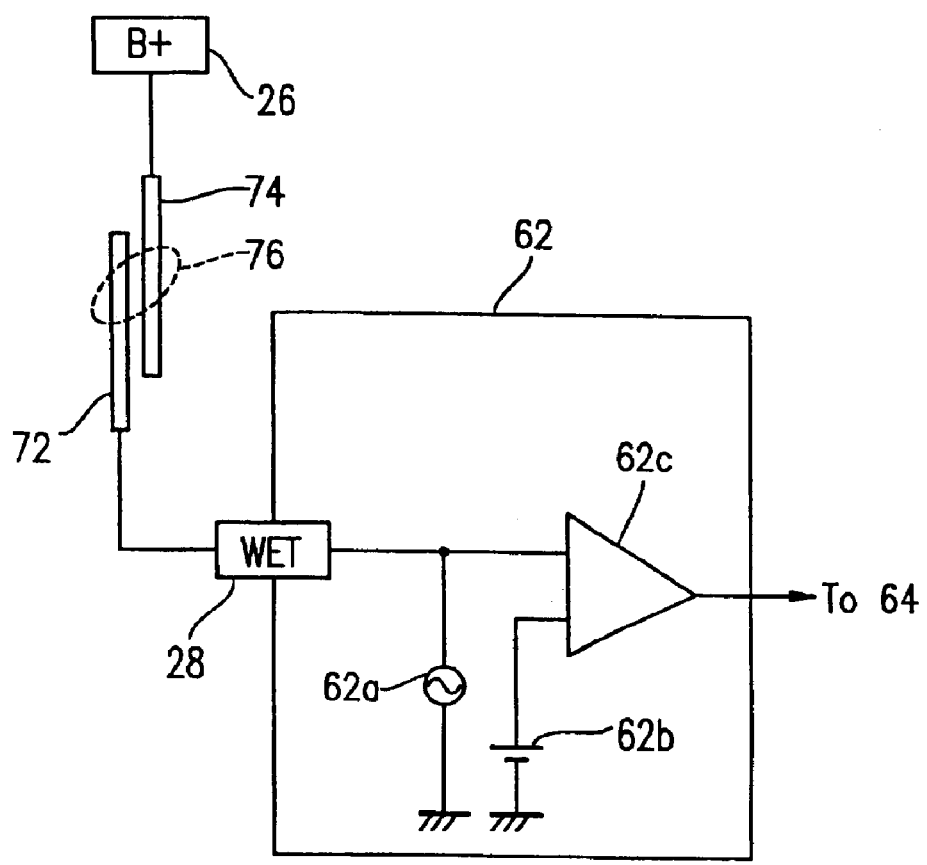
FIG. 4 is a drawing which shows a configuration example of a liquid detection section 62.

FIG. 4 shows a configuration example of the liquid detection section 62. The liquid detection section 62 includes a constant current source 62a, a reference voltage source 62b, and a comparator 62c. One of inputs of the comparator 62c is connected to the constant current source 62a and the WET terminal 28. The other input of the comparator 62c is connected to the reference voltage source 62b. An output of the comparator 62c is supplied to a charge/discharge stoppage logic 64.

When a liquid is detected by the liquid detection section 62, the liquid detection section 62 activates the charge/discharge stoppage logic 64. As a result, the charge/discharge stoppage logic 64 turns the switch (SW) 32 to the ON state. Accordingly, the gate voltage of the FET 30 goes LOW, and the FET 30 is turned to the OFF state, whereby both charging and discharging of the secondary battery 10 are disabled.

In this way, when a liquid is detected by the liquid detection section 62, the charge/discharge stoppage logic 64 controls the FET 30 so as to interrupt the charging/discharging of the secondary battery 10. Thus, it is possible to make a user aware of a malfunction or a corrosion of the circuit due to water or an electrolytic solution, etc., or a problem due to hydrofluoric acid being generated by addition of water to an electrolytic solution.

The interruption of charging/discharging by the charge/discharge stoppage logic 64 is performed prior to the interruption of charging/discharging by the system logic 46.

The secondary battery control circuit 20 further includes a voltage detecting/outputting section 48 that detects the voltage of the secondary battery 10 and outputs an output signal ($O_{V1}$–$O_{V6}$) corresponding to the detected voltage. A reference voltage is supplied from the reference voltage generation section 50 to the voltage detecting/outputting section 48.

Figure 5:
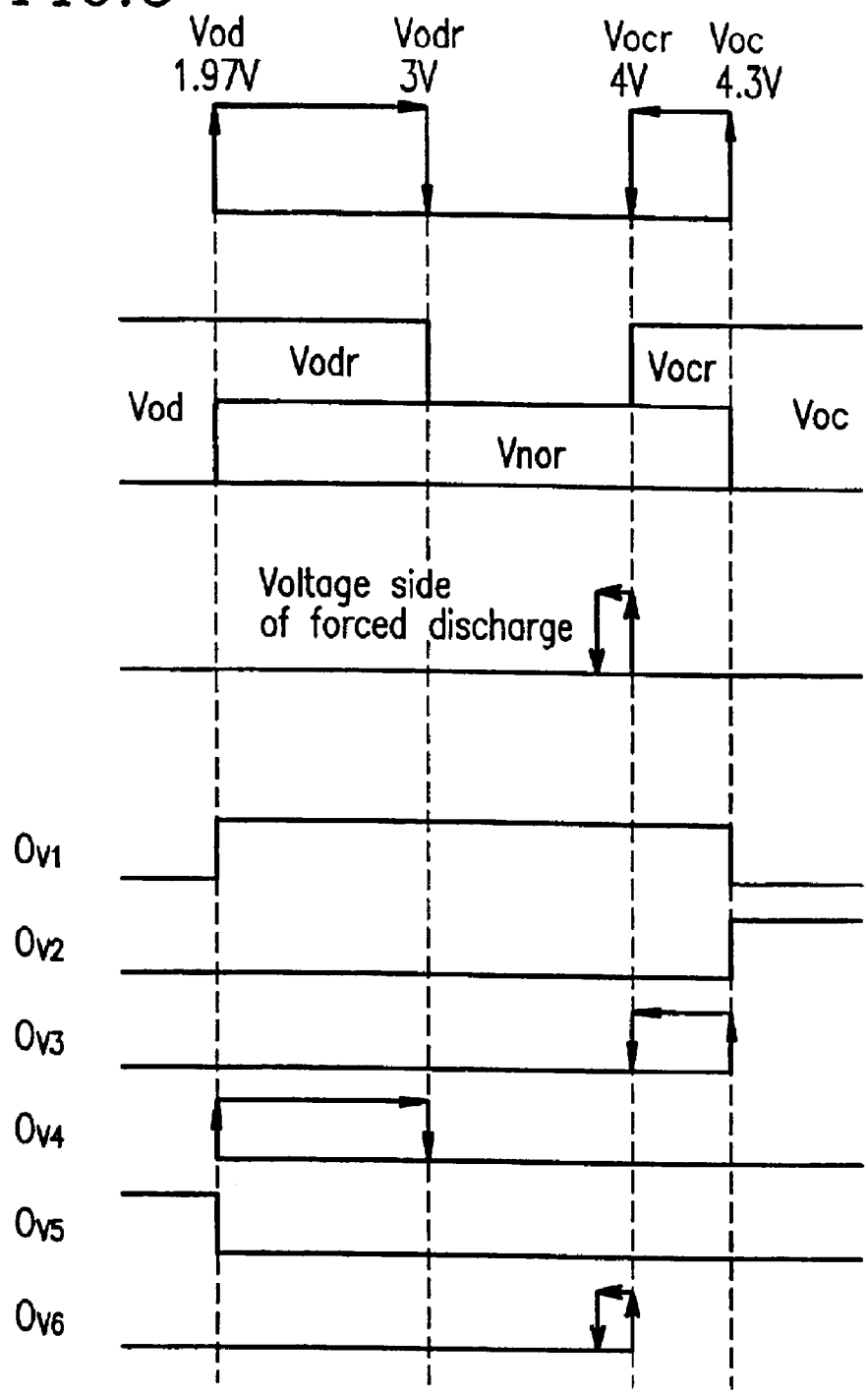
FIG. 5 is a drawing which shows a relationship between ranges for a detected voltage and logic levels of output signals $O_{V1}$–$O_{V6}$.

FIG. 5 shows a relationship between ranges for the detected battery voltage and the logic levels of the output signals $O_{V1}$–$O_{V6}$. In FIG. 5, Vnor denotes a normal state range; Voc denotes an overcharge range; Vocr denotes a discharging only enabling range; Vodr denotes a charging only enabling range; and Vod denotes an overdischarge range.

In the case where the detected battery voltage is within the normal state range Vnor, the system logic 46 sets the charge disabling signal CD to a H level, and sets the discharge disabling signal DD to a H level.

In the case where the detected battery voltage is within the overcharge range Voc or the discharging only enabling range Vocr, the system logic 46 sets the charge disabling signal CD to a L level.

In the case where the detected battery voltage is within the charging only enabling range Vodr or the overdischarge range Vod, the system logic 46 sets the discharge disabling signal DD to a L level.

The charge disabling signal CD and the discharge disabling signal DD are output from the system logic 46, and are supplied to the charge/discharge control section 42.

The charge/discharge control section 42 controls the state of the FET 30 based on the charge disabling signal CD and the discharge disabling signal DD. The interruption of charging/discharging by the system logic 46 based on an output from the temperature state output section 54 is performed prior to the interruption of charging/discharging by the system logic 46 based on an output from the voltage detecting/outputting section 48.

Furthermore, in the case where the output signal $O_{V6}$ (FIG. 5) is output from the voltage detecting/outputting section 48, and the output signal $O_{T5}$ from the temperature state output section 54 is at a H level, the forced discharge logic 56 is activated. The forced discharge logic 56 turns a switch (SW) 34 provided between the negative (−) terminal 24 and the B+ terminal 26 to the ON state, whereby the secondary battery 10 is forcibly discharged.

In this way, when the voltage detected by the voltage detecting/outputting section 48 is equal to or greater than a predetermined voltage value (e.g., 4 V), and the temperature detected by the temperature detection section 52 is equal to or greater than a predetermined temperature (e.g., 35° C.), the secondary battery 10 is discharged until reaching a predetermined voltage value (e.g., 3.9 V). Such a forced discharge can reduce deterioration in life cycle and swelling of the secondary battery 10 which result from the charged secondary battery 10 being in a high temperature condition.

For example, in the case where the charged secondary battery 10 is left in a temperature condition of 35° C. or more, the capacity of the battery can be reduced by 20% by performing the above-described forced discharge process, whereby deterioration in life cycle (the number of times that the battery can be used) can be reduced. Furthermore, in the case where the charged secondary battery 10 is left in a temperature condition of 60° C. or more, the capacity of the battery can be reduced by 20% by performing the above-described forced discharge process, whereby swelling of the battery can be prevented.

It is preferable that either a predetermined voltage value which is a starting condition for the forced discharge (e.g., 4 V) or a predetermined voltage value which is a canceling condition for the forced discharge (e.g., 4 V) is equal to the overcharge releasing voltage value Vocr. This is preferred because additional circuitry is not required for setting these predetermined voltage values to the overcharge releasing voltage value Vocr, and the overcharge releasing voltage value Vocr is a practically appropriate voltage value.

These predetermined voltage values can be detected by a single circuit having a hysteresis. Accordingly, the number of comparators can be reduced as compared to a case where a circuit not having a hysteresis is employed to detect a predetermined voltage value.

Figure 6:
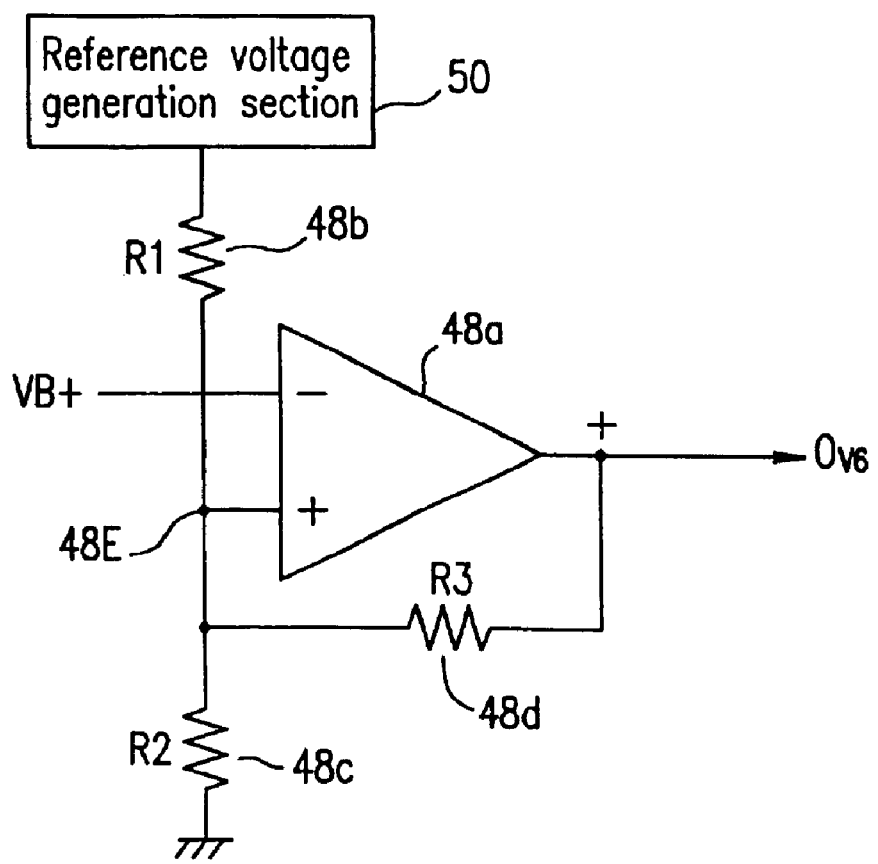
FIG. 6 is a drawing which shows a configuration of a portion of a voltage detecting/outputting section 48 which outputs the output signal $O_{V6}$.

FIG. 6 shows a configuration of a portion of a voltage detecting/outputting section 48 which outputs the output signal $O_{V6}$.

The output signal $O_{V6}$ is output from a comparator 48a. To one of the inputs of the comparator 48a (negative (−)

input), a voltage VB+ which is to be input to the voltage detecting/outputting section 48 is supplied. To the other input of the comparator 48a (positive (+) input), an output of the comparator 48a is fed back through a resistor 48d. Furthermore, the positive (+) input of the comparator 48a is connected to the reference voltage generation section 50 through a resistor 48b, and connected to ground through a resistor 48c. Herein, the resistance values of the resistors 48b, 48c, and 48d are R1, R2, and R3, respectively.

In the case where the voltage VB+ is smaller than a voltage of the positive (+) input of the comparator 48a (reference voltage 48E), the reference voltage 48E is represented by expression (2-1) shown below:

$$(\text{Output of reference voltage generation section } 50) \times R2 / \{R1 \times R3/(R1+R3)+R2\} \quad (2\text{-}1)$$

In the case where the voltage VB+ is higher than the voltage of the positive (+) input of the comparator 48a (reference voltage 48E), the reference voltage 48E is represented by expression (2-2) shown below:

$$\{(\text{Output of reference voltage generation section } 50) \times (R2 \times R3)/(R2+R3)\}/\{R2 \times R3/(R2+R3)+R1\} \quad (2\text{-}2)$$

In this way, the comparator 48a can possess a property of hysteresis by automatically changing the reference voltage 48E based on whether the voltage VB+ is smaller or higher than the reference voltage 48E. Therefore, a predetermined voltage value which is the starting condition for the forced discharge and a predetermined voltage value which is the canceling condition for the forced discharge can be established by using a single comparator 48a.

Furthermore, the canceling condition for the forced discharge may include the temperature condition for the secondary battery 10. For example, the forced discharge may be cancelled when the voltage of the secondary battery 10 reaches a predetermined voltage value (e.g., 4 V) and the temperature of the secondary battery 10 reaches a predetermined temperature.

Still further, a resistor 36 provided between the switch (SW) 34 and the B+ terminal 26 is generally formed on a semiconductor chip 20a. However, the resistor 36 may be provided outside the semiconductor chip 20a so that the value of the resistor 36 can be adjusted from the outside of the semiconductor chip 20a.

FIG. 7 is a cross-sectional view that shows a structure in which the secondary battery control circuit 20 of the present invention is positioned in a sealing section 80 of the secondary battery 10. As shown in FIG. 7, the secondary battery control circuit 20 is accommodated inside the sealing section 80. An explosion-proof space in the sealing section 80 is considered in a space for accommodating the secondary battery control circuit 20. This structure is described in Japanese Co-Pending Application No. 10-323643.

INDUSTRIAL APPLICABILITY

According to a secondary battery control circuit of the present invention, in the case where a temperature detected by a temperature detection section is out of a predetermined first temperature range or out of a predetermined second temperature range, charging/discharging of the secondary battery is interrupted. This prevents a liquid leakage phenomenon of an electrolytic solution due to the activation of a PTC element installed in the secondary battery.

Further, according to a secondary battery control circuit of the present invention, in the case where a voltage detected by a voltage detection section is equal to or greater than a predetermined first voltage value, and the temperature detected by a temperature detection section is equal to or greater than a predetermined temperature, the secondary battery is discharged until the voltage of the secondary battery reaches a predetermined second voltage value which is smaller than the predetermined first voltage value. By such a forced discharge, deterioration of a life cycle and swelling of the secondary battery due to the charged secondary battery being in the high temperature condition can be prevented.

Furthermore, according to a secondary battery control circuit of the present invention, in the case where the generation of a liquid is detected by a liquid detection section, charging/discharging of the secondary battery is interrupted. This allows a user to notice a malfunction or a corrosion of a circuit due to a liquid, such as water or an electrolytic solution, etc., or a problem caused due to hydrofluoric acid being generated by addition of water to an electrolytic solution.

What is claimed is:

1. A secondary battery control circuit comprising:
    a voltage detection section for detecting a voltage of a secondary battery;
    a temperature detection section for detecting a temperature of the secondary battery; and
    a control section for controlling charging/discharging of the secondary battery based on a voltage detected by the voltage detection section and a temperature detected by the temperature detection section, wherein
    in a case where the voltage detected by the voltage detection section is equal to or greater than a predetermined first voltage value, and the temperature detected by the temperature detection section is equal to or greater than a predetermined temperature, the control section discharges the secondary battery until the voltage of the secondary battery reaches a predetermined second voltage value.

2. A secondary battery control circuit according to claim 1, wherein the predetermined first voltage value and the predetermined second voltage value are detected by a single circuit having a hysteresis.

3. A secondary battery control circuit according to claim 1, wherein either the predetermined first voltage value or the predetermined second voltage value is equal to an overcharge releasing voltage value.

4. A secondary battery control circuit according to claim 1, wherein a discharge canceling condition for the secondary battery includes a temperature condition for the secondary battery.

5. A secondary battery control circuit according to claim 1, wherein the secondary battery control circuit is formed on a single semiconductor chip.

6. A secondary battery control circuit according to claim 5, wherein the single semiconductor chip is enclosed in a sealing section of the secondary battery.

* * * * *